US005992632A

United States Patent [19]

Karren

[11] Patent Number: 5,992,632

[45] Date of Patent: Nov. 30, 1999

[54] PORTABLE REUSABLE HAZARDOUS WASTE CONTAINER SYSTEM

[76] Inventor: Glen Karren, P.O. Box 240, Duchesne, Utah 84021

[21] Appl. No.: 08/893,338

[22] Filed: Jul. 16, 1997

[51] Int. Cl.$^{6}$ .................................................. B65D 21/032

[52] U.S. Cl. .......................... 206/518; 206/519; 137/255

[58] Field of Search .................................... 206/515, 516, 206/518, 519; 220/571; 137/255, 259, 571, 572, 576

[56] References Cited

U.S. PATENT DOCUMENTS

| | | | |
|---|---|---|---|
| 1,620,059 | 3/1927 | Betts | 206/519 |
| 2,602,568 | 7/1952 | Kinney, Jr. | 206/519 |
| 2,667,422 | 1/1954 | Kauffman | 206/519 |
| 3,346,271 | 10/1967 | Parsons | 206/515 |
| 4,120,312 | 10/1978 | Michael | 137/255 |
| 4,290,444 | 9/1981 | Bevan | 137/571 |
| 4,354,600 | 10/1982 | Treiber | 206/519 |
| 4,525,100 | 6/1985 | Zawadzki, Jr. et al. | 405/129 |
| 4,534,466 | 8/1985 | Wood | 206/518 |
| 4,595,474 | 6/1986 | Greco | 137/571 |
| 4,650,086 | 3/1987 | Morrison, jr. | 220/66 |
| 4,744,385 | 5/1988 | Houghton | 137/255 |
| 4,776,409 | 10/1988 | Manchak, Jr. | 175/50 |
| 4,804,092 | 2/1989 | Jones | 206/519 |
| 4,991,716 | 2/1991 | Havlovitz | 206/518 |
| 5,114,046 | 5/1992 | Bryant | 220/571 |
| 5,217,507 | 6/1993 | Spirig | 55/159 |
| 5,276,252 | 1/1994 | Biros et al. | 588/249 |
| 5,310,285 | 5/1994 | Northcott | 588/250 |
| 5,575,303 | 11/1996 | Hulbert | 137/255 |

*Primary Examiner*—Stephen Castellano
*Attorney, Agent, or Firm*—Madson & Metcalf

[57] ABSTRACT

The present invention relates to a portable reusable hazardous waste container system which preferably includes a plurality of elongate waste containers which are attachable in fluid flow communication with each other and with a drilling apparatus. The containers can be transported to a drilling site by stacking them in nesting fashion on a transport vehicle and can be emptied of drilling waste after a drilling operation is completed and retransported to another drilling site. The containers include a bracing structure at the bottom thereof which allows each container to be nested within another container without causing substantial frictional interference which would make it difficult to separate the containers for reuse. The waste container system of the present invention alleviates the need for construction of a ground pit for storage of drilling waste at a drilling site.

9 Claims, 5 Drawing Sheets

12
10
22
14
28
18
16
24
26
20

10
64
38
42
30
62
40
30
38
42

PORTABLE REUSABLE HAZARDOUS WASTE CONTAINER SYSTEM

BACKGROUND OF THE INVENTION

1. Field of the Invention

The present invention relates to the handling of hazardous waste. More specifically, the present invention relates to portable, reusable containers in which liquid material for use with oil or gas drilling equipment can be circulated during use, and wastes therefrom can be temporarily stored for later disposal after use.

2. Prior Art

Oil and gas drilling operations produce drill cuttings or "tailings" that consist of material removed from a well, with mixtures of other liquids and materials that are used to facilitate drilling. These materials are generally unwanted by products once the drilling process is completed, and are a present or potential danger to the health of humans or other living organisms because they often exhibit undesirable properties such as toxicity, carcinogenicity, non-degradeability, biological magnification or the like. With present technology, a wide variety of useful products cannot be manufactured without also producing some hazardous waste. It is not presently possible to recycle all of the waste, so safe means of handling and disposal must be found.

As awareness of the dangers of air and water pollution has increased, methods of disposing of waste into the air, such as by burning, and into rivers or oceans, have been recognized as being undesirable in many situations. Legislation and regulations strictly limit such disposal methods in the United States and in many other countries.

As the disposal of hazardous wastes into the air and water has been reduced, there naturally has been an increase in the amount of disposal on land. One method has been to bury the wastes in a landfill. For example, one method is to pump the waste back into the well after the drilling operation has been completed. Another method, used especially for wastes including the tailings, spent drilling liquids, and other materials such as drilling "mud" type wastes resulting from a drilling operation is to pump the waste into open surface pits for storage. Since it is necessary to dig an open surface, or ground pit, to hold and circulate the large volume of fluids used and generated during the drilling process, it has often been most cost effective to leave the waste liquid in this same pit which was made and used during the drilling operation. This resulted in hazardous waste ground pits being located in numerous places which were often relatively unsuitable, instead of being brought to a more central, safe and suitable storage location.

In many land-based disposal sites, the prevention of waste from contaminating the ground water supply is a major concern. Therefore, ground pits which are dug for the purpose of storing the drilling fluids must be provided with a liner, such as a plastic material, which prevents leakage of the liquid into the soil. When this type of ground pit is used for long term storage of the liquids however, it entails numerous drawbacks. These drawbacks include: the impossibility of making a visual check on the wastes and on their progress; the great difficulty and the high cost of taking samples for the periodic analysis that are normally necessary; the difficult problem raised by the need for quantitative and qualitative follow-up measures; the signs of the changes undergone by the stored wastes, such as leaching of liquid into the soil; the presence of malodorous or even explosive gases; the need, when the discharge produces intolerable pollution, to remove the stored wastes and process them elsewhere, which leads to difficult and extremely costly operations; and finally, the understandable climate of suspicion that grows among the surrounding populous. It is therefore an imperative and pressing need for storage systems for fluids used in the drilling process which avoid the need to dig expensive ground pits, and which facilitate removal of the waste fluids after the drilling operation is completed to a suitable waste collection and storage facility.

Further, as public awareness of hazardous waste has increased, it has been necessary to clean up the ground pit waste storage sites which have become unsatisfactory. Although the "Superfund" program in the United States has helped in the recovery of hundreds of hazardous waste sites which have already been identified in which waste is not now safely stored, there is nevertheless a large expense involved to the drilling companies in reclaiming unsatisfactory ground pit sites. Also, the increased public and scientific concern about hazardous waste has drastically slowed the opening of new landfills and increased the regulations for proper digging of new ground pits. Proposing the digging of a new ground pit for a main landfill site raises difficult political as well as technological questions, which are often addressed in regulatory proceedings which can be very lengthy.

Therefore, at a time when the demand for environmentally sound disposal facilities is large, and the supply of such facilities has been sharply limited, any procedure that would permit the optimal use of each satisfactory collection site, and avoid the need for the use of ground pits at each individual drilling site, would be a tremendous benefit. Further, any such improved procedure which allows the saving of time and expense in the drilling procedure, and which would be reusable for numerous different drilling operations, would be an added significant benefit.

The present invention is an improvement in hazardous waste storage technology which can help solve the above enumerated problems presently existing with the storage and handling of drilling fluids.

OBJECTS AND SUMMARY OF THE INVENTION

It is an object of the present invention to provide a system for the storage of hazardous materials such as those used and/or generated during the process of drilling oil and gas wells.

It is another object of the present invention to provide a system for the storage of hazardous waste which is more environmentally acceptable, and less costly, both in time and expense, than prior art ground pits.

Another object of the present invention is to provide a system for storage of hazardous wastes which is both portable and reusable.

A further object of the present invention is to provide a method for providing a portable and reusable hazardous waste storage system at a drilling site for circulating and temporarily storing hazardous waste materials used at a drilling site.

These and other objects and advantages of the present invention are realized in a presently preferred embodiment of a waste container system which includes portable, reusable hazardous waste containers. Each container preferably includes a plurality of structural members that define an enclosed volume, each of the members being substantially impermeable to water, corrosion resistant, and having structural strength sufficient to withstand being lifted, transported, assembled together at a drilling site, filled with fluid used to facilitate the drilling operation by circulating the fluid through the containers during the drilling operation, emptied, disassembled, and transported to a new site for reuse. The structural members as recited above are meant to include walls, bottoms, sides, etc. which are designed to maximize the fluid volume which can be held by the containers while at the same time maintain the size and shape necessary for convenient stacking of the containers for removal from a transport vehicle and for movement from site to site. In the preferred embodiment of the invention, the containers are generally elongate rectangular shaped containers having a unique cross-sectional bottom shape which allows them to be stacked within each other for transport, and thereafter easily removed and separated from each other for assembly at a drilling site.

The preferred design of the invention allows for simple and rapid transportation of the containers to a drilling site, set up of the containers for receipt and circulation of drilling fluids, emptying and cleaning of the containers after the drilling process has been completed, and disassembly and retransport thereof to subsequent drilling sites. The process of setting up the containers for use as anticipated in the present invention takes a matter of only a few hours of work for the drilling crew, as opposed to the several day long process of constructing a ground pit for the same purpose.

The above and other objects and advantages of the present invention are realized in a presently preferred embodiment thereof, shown and described by way of example and not by way of limitation, and the following detailed description of the invention and the drawings, in which similar structure is identified with similar numbers throughout.

DETAILED DESCRIPTION OF THE PREFERRED EMBODIMENT

Figure 1:
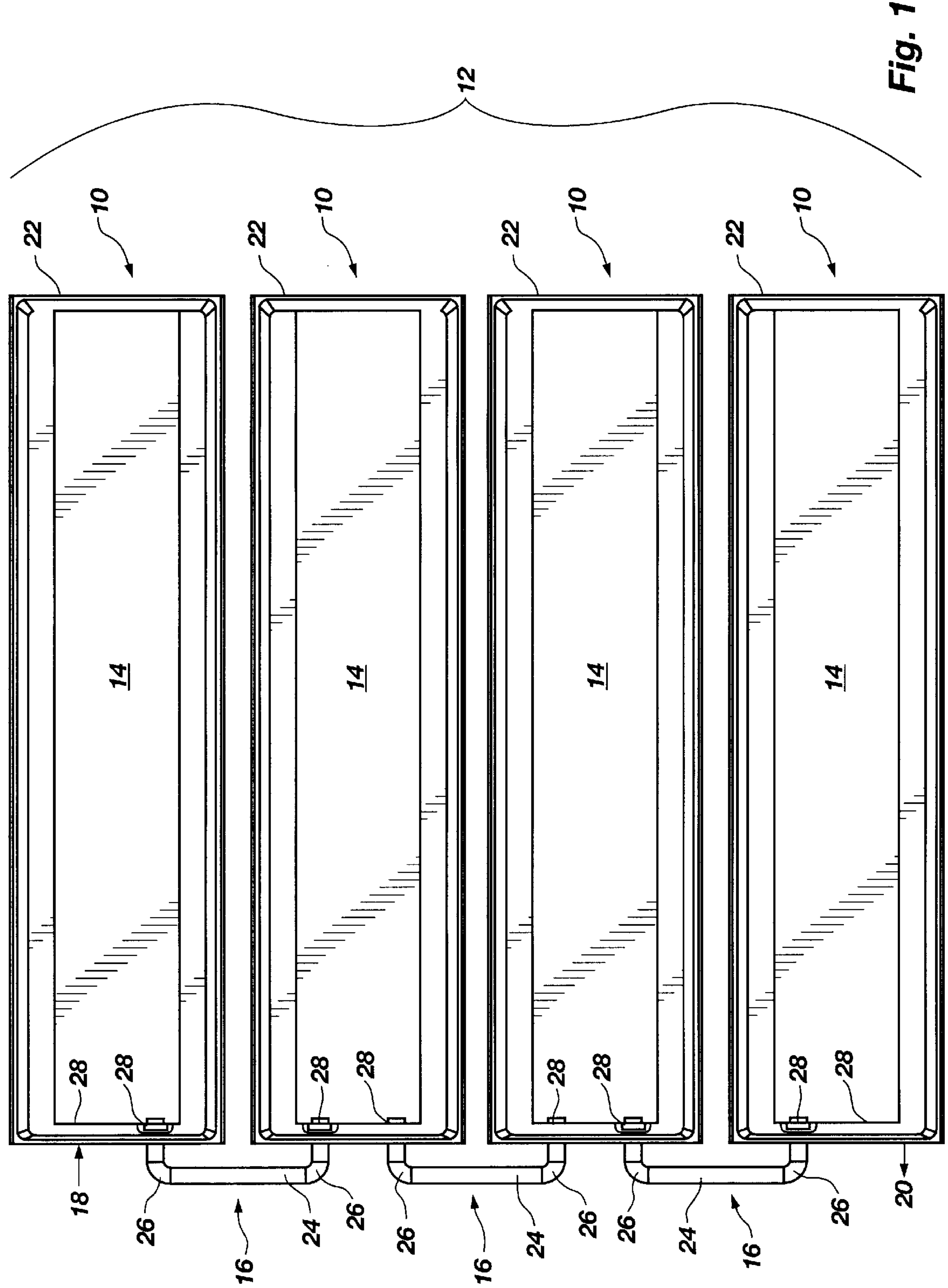
FIG. 1 shows a top plane view of a portable, reusable hazardous waste container system made in accordance with the principles of the present invention.
Figure 2:
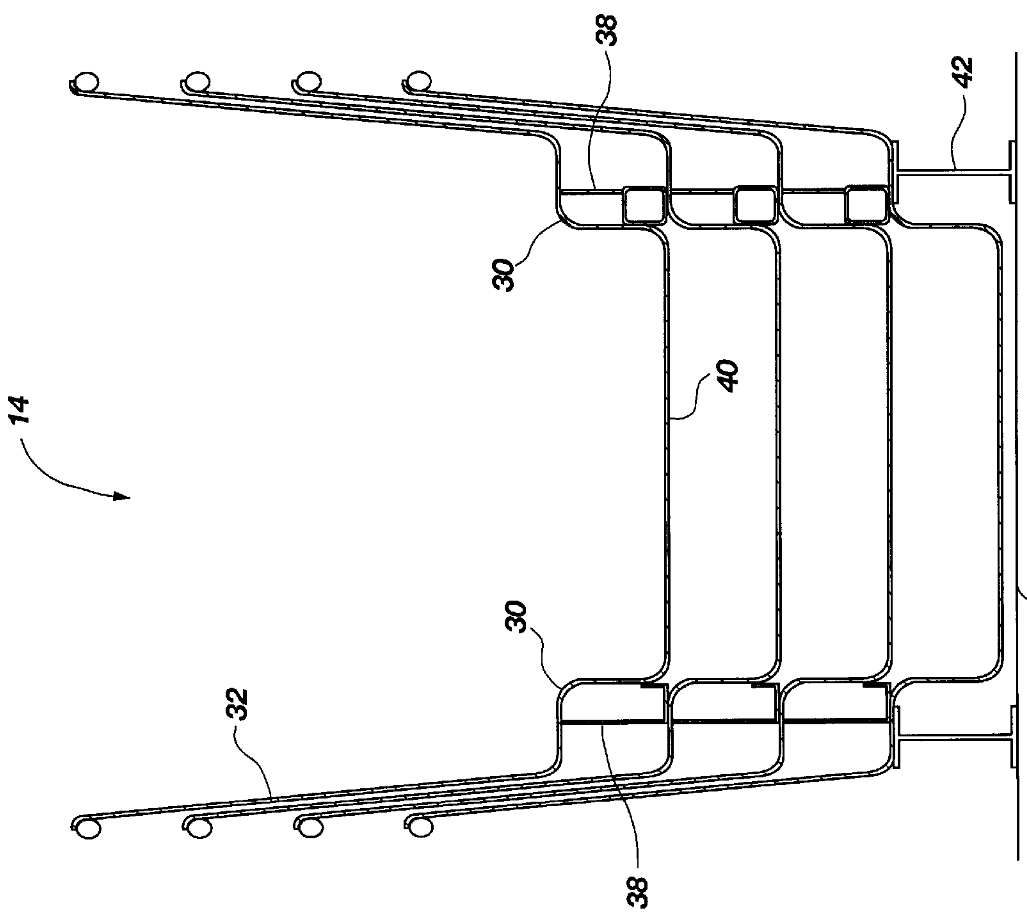
FIG. 2 shows a cross-sectional view of a set of four containers made in accordance with the principles of the present invention stacked in their preferred configuration for transport to or from a drilling site.

Referring now to the drawings, each container 10 of the portable reusable hazardous waste container system 12 has preferably a rectangular shaped top opening 14, as shown in FIGS. 1 and 2. Connections between the containers in the system 12 may be made by connection pipes 16 with a connection to the well drilling apparatus (not shown) through drill connector inlet 18 and drill connector outlet 20. The connection pipes 16 connect each of the containers 10 serially for flow of drilling fluid from the drill connector inlet 18 through each of the containers 10 and out the drill connector outlet 20. The drill connector inlet 18 returns fluid from the well drilling apparatus and the drill connector outlet 20 sends fluid to the well drilling apparatus. In this way, fluid circulates through the entire system 12 during drilling operations.

Each container 10 is preferably formed of ¼ inch steel with dimensions of approximately 40 feet in length, 8 feet in width, and 5½ feet in height. This size has the advantage of being optimal for fitting on a conventional 20 ton transport vehicle. Further, this preferred size and material make up of the containers 10 also causes the total weight of four containers to approximately equal the 20 ton load limit of the vehicle.

The presently preferred method of forming each container 10 includes bending five, eight foot sections into the desired cross-sectional shape and welding each section together to form the 40 foot length. Then, welding end pieces 22 to each end of the 40 foot length.

The connection pipes 16 are preferably formed of approximately four to five foot long sections 24 having elbow sections 26 at each end thereof which attach to each container 10 through openings 28. The connector pipes 16 are preferably made of Schedule 20 plastic with an eight inch diameter.

As shown in FIG. 2, the containers 10 can be stacked inside each other for transport to the drilling site. The cross-sectional shape of each container includes a pair of shoulders 30 which extend along each side of the length of the bottom of the container 10. Also, each side wall 32 is slanted outwardly at a small angle, preferably approximately 6.34 degrees (which is a slope of 1 inch in 9 inches), to assist in the nesting thereof with other containers 10.

Figure 3:
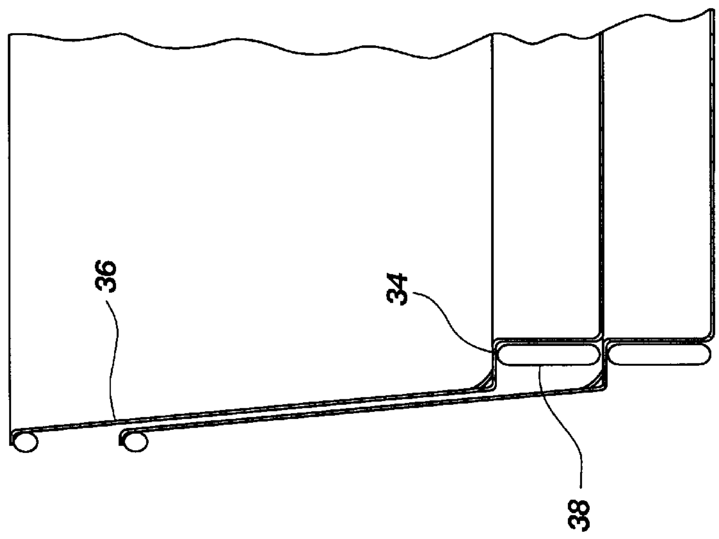
FIG. 3 shows a cross-sectional view taken along the length of a single container made in accordance with the principles of the present invention.

As shown in FIG. 3, shoulders 34 also extend along the bottom of each of the containers 10 and end walls 36 are also slanted outwardly to assist in nesting other containers 10.

As best shown in FIGS. 2 and 3, nesting braces 38 are positioned beneath the side shoulders 30 and end shoulders 34 and extend to the bottom surface 40 of each container 10. These nesting braces interfere with the shoulders 30 and 34 of any second container 10 into which the first container 10 is being nested. Thusly, when a first container 10 is nested within a second container 10, only the nesting braces 38 of the first container 10 will contact the shoulders 30 and 34 of the second container. In this way, a secure nesting of containers is produced with the minimum of frictional interferences therebetween which could inhibit the later separation of the containers 10 for use.

Referring again to FIG. 2, a flat surface 44 of a transport vehicle (not shown) receives the nesting braces 42 of the outermost container 10. These nesting braces 42, (preferably referred to as skid beams) rest on the vehicle flat surface 44 in such a way that the bottommost container 10 contacts only the skid beam type nesting braces 42, leaving the bottom surface 40 of the bottommost container 10 resting slightly above the surface 44 of the transport vehicle. In this way, loading and unloading of the containers 10 is simplified.

Figure 4:
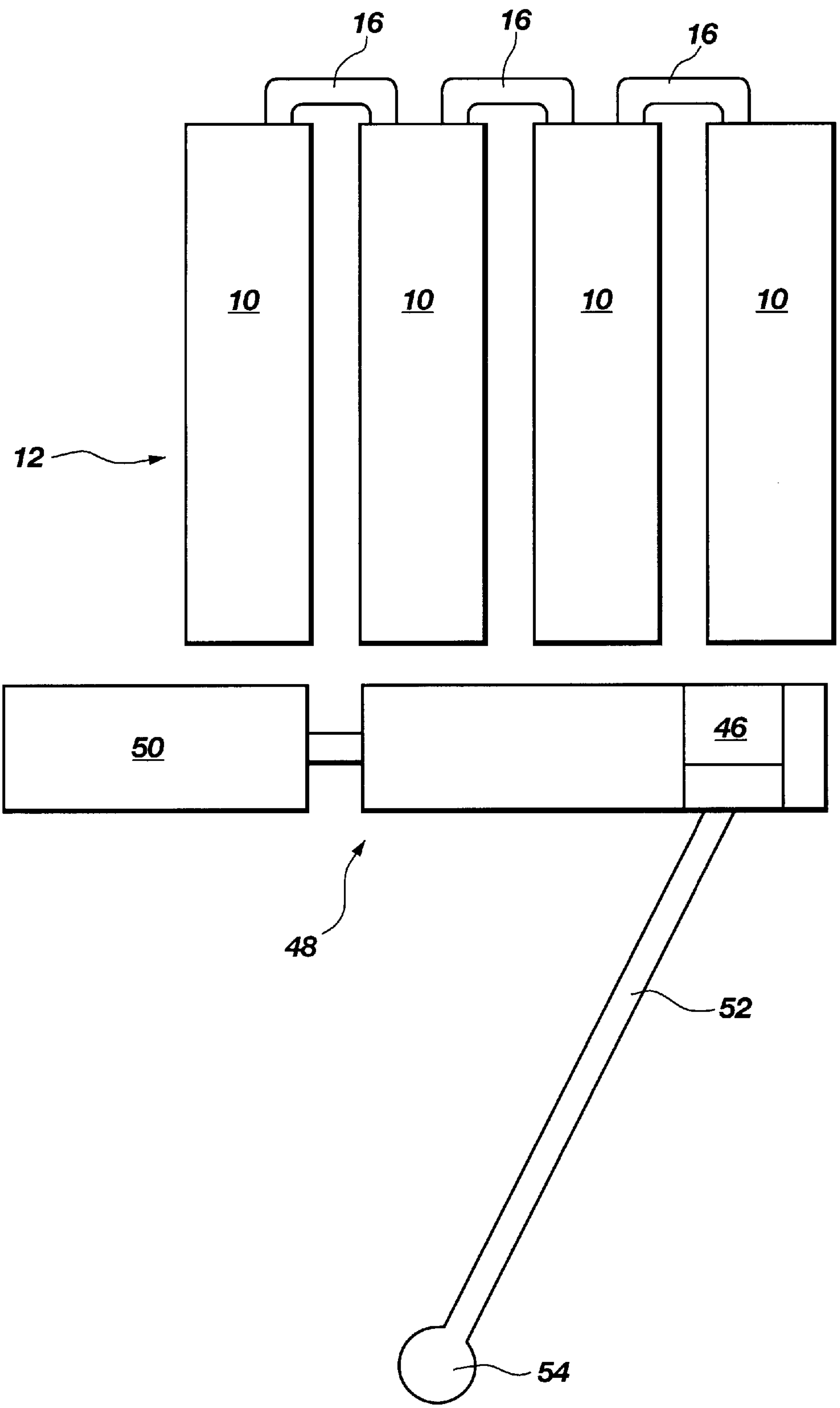
FIG. 4 shows a top plan view of a portable, reusable hazardous waste container system made in accordance with the principles of the present invention in conjunction with a mud and/or clear water drilling operation.

Referring now to FIG. 4, the container system of the present invention is shown attached to a mud and/or clear water drilling apparatus 48 in the same way as the mud drilling apparatus 48 is commonly connected to a prior art type ground pit. The shale shaker 46 of the drilling apparatus 48 separates cuttings from the drilling fluid and deposits them in the containers 10 along with excess drilling fluid.

Drilling fluid is mixed with the drilling mud from the mud reservoir 50 and forced down the flow line 52 to the end of the well bore 54. Returning fluid and cuttings again pass through the shale shaker 46 and into the containers 10.

Figure 5:
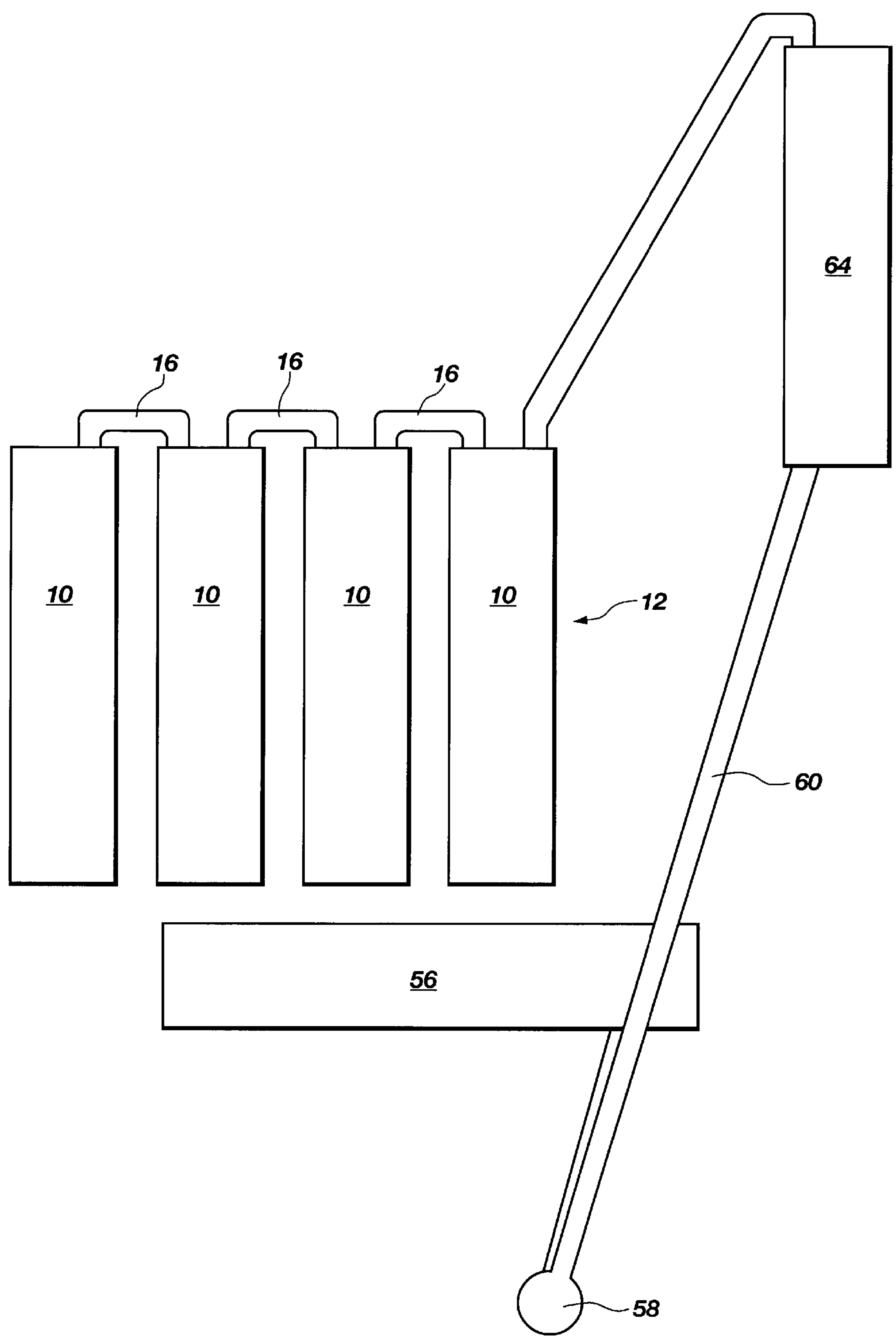
FIG. 5 shows a top plan view of a portable, reusable hazardous waste container system made in accordance with the principles of the present invention in conjunction with an air drilling operation.

Referring now to FIG. 5, the container system of the present invention is shown attached to an air drilling apparatus 56 in the same way as the air drilling apparatus is commonly connected to a prior art type ground pit. All cuttings and well water (if any) are passed from the well bore 58 through the Blouey line 60 into the containers 10.

Figure 6:
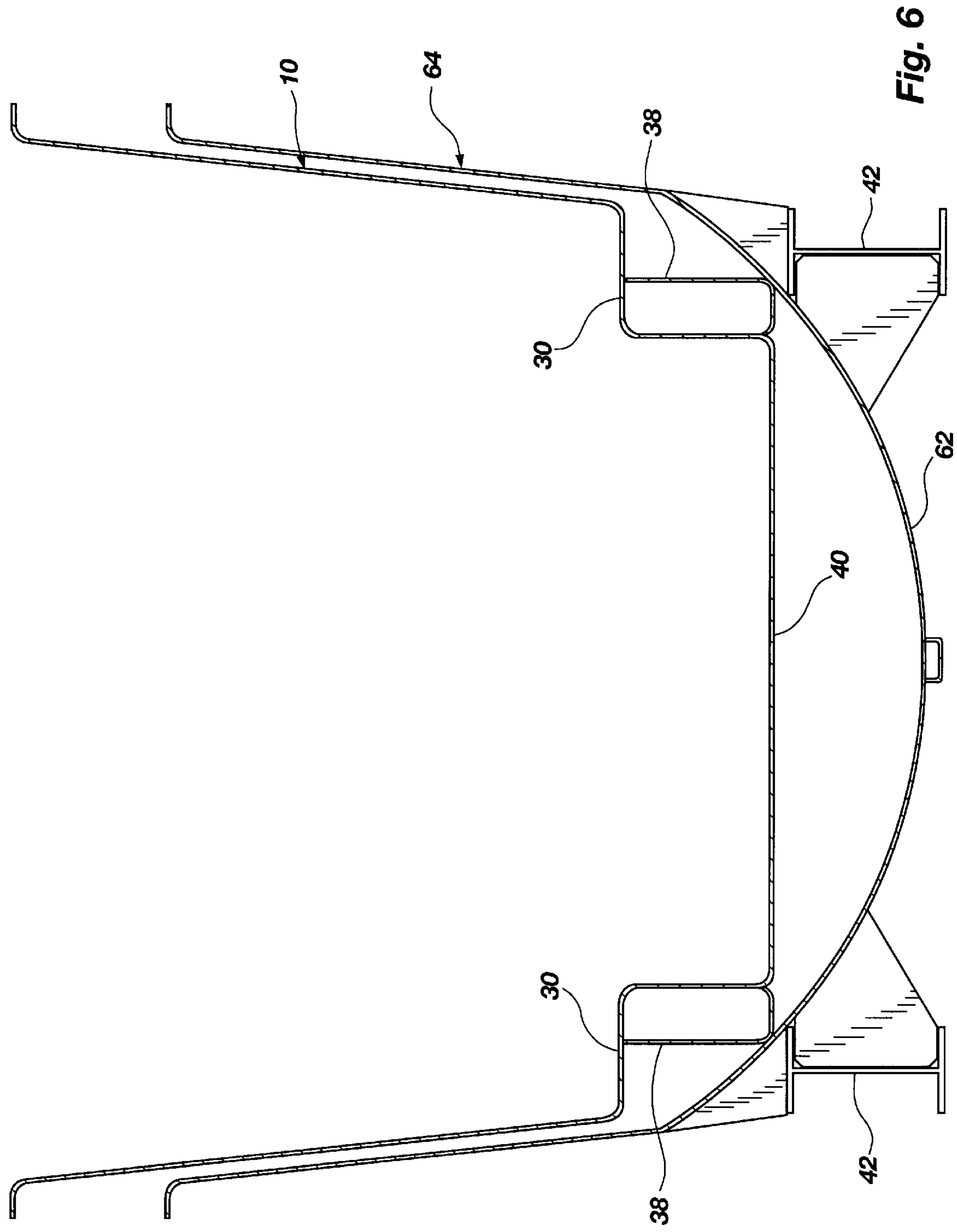
FIG. 6 shows a cross-sectional view of an alternative preferred embodiment of a container made in accordance with the principles of the present invention which includes a semi-cylindrical bottom.

FIG. 6 shows an alternate preferred embodiment of the containers 10 which includes a completely rounded bottom 62 instead of the shouldered arrangement described above. As can be seen, the round bottom container 64 is preferably formed with the skid beam type nesting braces 42, and is preferably used as the bottommost container when stacked onto the transport vehicle (not shown). The round bottom container 64 is preferably placed in the first position relative to the drilling apparatus 48 or 56 (see FIGS. 4 and 5) so that the waste from the drilling apparatuses is first delivered into the container 64 before flowing to the other containers 10. The result of this placement is that the majority of the heavier waste materials, such as the cuttings and other solid material tend to be concentrated therein. Once the drilling operation is completed, cleaning of the containers is simplified by the round bottom of container 64. This is because the container 64 can be easily emptied of its solid waste materials through the use of a back hoe due to its rounded bottom shape.

PREFERRED METHOD OF USE

The preferred system operation will now be described. The system 12 of the present invention is first loaded onto a transport vehicle in the nesting manner as best shown in FIG. 2 for transport to a drilling site, by placing preferably four containers 10 onto the transport vehicle. If eight containers will be needed at the drilling site, a second transport vehicle is loaded.

At the preferred drilling site, the containers 10 are unloaded from the transport vehicle one by one, and placed on a relatively flat section of ground adjacent the well drilling apparatus in the side-by-side formation shown in FIGS. 4 and 5. The connection pipes 16 are then attached to each of the containers 10, and the drill connector inlet 18 and drill connector outlet 20 are then attached to the well drilling apparatus (not shown) for delivery and return of fluid to and from the well drilling apparatus during operation.

Once the connections are completed, the containers and drilling apparatus are filled with a desired drilling fluid such as KCL water and/or drilling mud as needed or desired for the particular drilling operation. When the well drilling apparatus is in operation, fluid circulates through the containers 10 of the system 12 and through the drilling apparatus. Once the drilling is completed, the fluid is then either pumped directly into the newly completed well for permanent storage, or a separate pumping device is placed into the containers 10, and the liquid is pumped out of the containers 10, and the solid waste is removed from container 64 (if part of the system), and transported to a suitable waste disposal site.

When the containers 10 are again empty of waste, they are detached from the well drilling apparatus and the connection pipes 16 thereof are removed. The containers 10 are then restacked in a nesting fashion onto the transport vehicle and transported to a new drilling site.

It will be apparent from the foregoing that, while a particular embodiment of the present invention has been illustrated and described, various modifications can be made thereto without departing from the spirit and scope of the present invention. Accordingly, it is not intended that the invention be limited, except as by the appended claims.

I claim:

1. A container system for use in conjunction with a drilling apparatus for collecting waste from a drilling operation comprising:

a plurality of containers defined by fluid-retaining walls, wherein each container has one or more fluid openings in one or more of said fluid-retaining walls and wherein each container has a bracing structure to allow any said container to be placed within any other container in a nesting configuration, such that only their respective bracing structures contact any other of said container, wherein the containers each include at least one shoulder portion located adjacent a bottom portion of the container for receiving the bracing structure; and a plurality of connection pipes configured to be connected to said fluid openings to enable said containers to be joined in series for fluid flow therebetween.

2. A container system according to claim 1 wherein the system includes at least four containers joinable in serial fluid flow connection.

3. A container system according to claim 1 wherein at least one of the containers includes a round bottom portion.

4. A container system according to claim 1 wherein the containers have a length of approximately 40 feet.

5. A container system for use in conjunction with an oil and gas drilling apparatus for collecting waste from an oil and gas drilling operation comprising:

a plurality of containers defined by fluid-retaining walls, wherein each container has one or more fluid openings in one or more of said fluid-retaining walls and wherein each container has a bracing structure to allow any said container to be placed within any other container in a nesting configuration, such that only their respective bracing structures contact any other of said container so that said containers are adapted to be compactly stored and easily transported from one oil and gas drilling operation to another oil and gas drilling operation; and a plurality of connection pipes configured to be connected to said fluid openings to enable said containers to be joined in series for fluid flow therebetween.

6. A container system according to claim 5 wherein the containers each include at least one shoulder portion for receiving the bracing structure.

7. A container system according to claim 5 wherein the system includes at least four containers joinable in serial fluid flow connection.

8. A container system according to claim 5 wherein at least one of the containers includes a round bottom portion.

9. A container system according to claim 5 wherein the containers have a length of approximately 40 feet.

* * * * *